United States Patent [19]
Gardiner

[11] 3,834,128
[45] Sept. 10, 1974

[54] LIQUID CLARIFYING APPARATUS FOR REMOVING PARTICLES FROM A GAS STREAM

[75] Inventor: Gregory E. Gardiner, Cromwell, Conn.

[73] Assignee: Environmental Maintenance Corp., Orange, Conn.

[22] Filed: Dec. 4, 1972

[21] Appl. No.: 311,864

[52] U.S. Cl. ............ 55/228, 55/229, 55/244, 210/96
[51] Int. Cl. ............................. B01d 47/02
[58] Field of Search ........... 55/85, 89, 95, 228, 229, 55/244, 248; 48/196; 210/96, 152, 205

[56] References Cited
UNITED STATES PATENTS

| 2,980,522 | 4/1961 | Dille et al. | 48/196 |
| 2,989,037 | 6/1961 | Filippino et al. | 210/96 |
| 3,256,902 | 6/1966 | Porter | 210/96 |
| 3,693,797 | 9/1972 | Topol | 210/96 |

Primary Examiner—Charles N. Hart
Attorney, Agent, or Firm—DeLio and Montgomery

[57] ABSTRACT

Apparatus for treating a scrubbing liquid to remove coagulants and suspended particulate matter before reuse or discharge of liquid where the suspended particles are caused to flocculate onto the coagulants.

3 Claims, 1 Drawing Figure

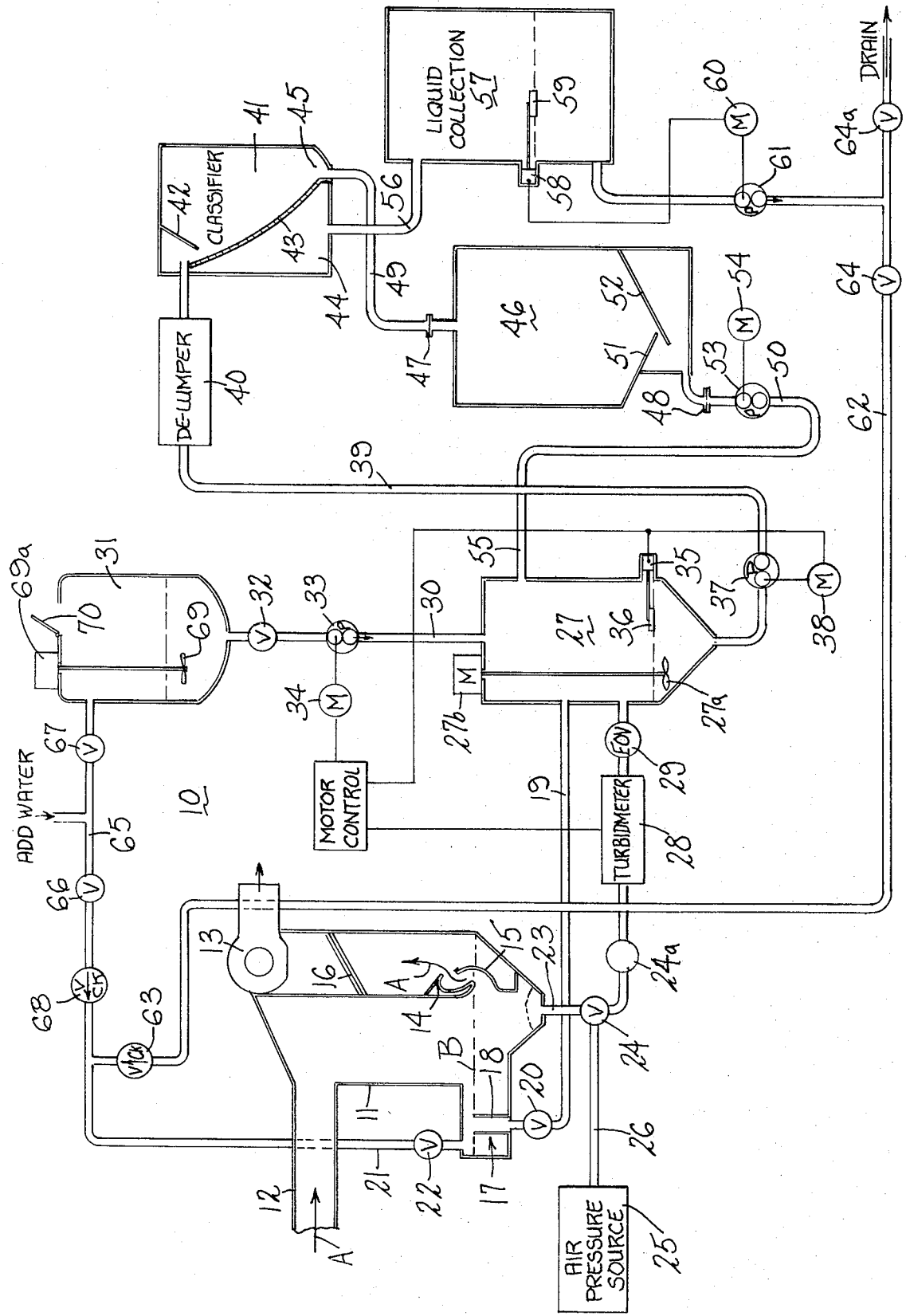

LIQUID CLARIFYING APPARATUS FOR REMOVING PARTICLES FROM A GAS STREAM

This invention relates to an apparatus for clarifying a liquid agent, and more particularly relates to such method and apparatus where particles in suspension and coagulated particles must be periodically or continuously cleaned from a separation device such as a dust collector or air scrubber.

In many industrial applications, fumes, waste, by-products and other useless matter, such as grinding dust, must be removed from a manufacturing operation or work station. Typical devices for such removal may be ducted exhaust systems leading to a hood over the work station where oil mists, grinding dust, and such may be removed from the installation, passed through a dust collector or air scrubber and collected for reuse or disposal.

However in some installations, depending on the waste by-products, these various air or gas purifiers or oil mist removing devices cannot be used with total efficiency because of the characteristics of the particles in the collecting device which may tend to stick to the inside of the collector.

These problems are compounded by the fact that the collecting device can generally only be shut down about once a week, and the collected liquid together with the suspended solids therein must be discarded. The liquid, usually water, cannot be discharged into municipal sewer lines or storm drains because of the pollution problems involved. As a result, it is general practice to contract with a refuse disposal contractor to remove the waste liquid including suspended solids from the dust collector. This usually entails manually loading large drums to a site where they can be picked up by the contractor. Large quantities of water must also be discarded, increasing the disposal costs.

As a result, it is not difficult to envision the expenses of maintaining a collector of this type in terms of man hours expended in the plant and money paid to an outside contractor for hauling and disposal. Additionally, the continued existence of an outlet with a refuse disposal contractor is becoming questionable. At the present time, most governmental and municipal agencies attempt to have wastes treated as fully as possible in the plant and to have solid wastes segregated completely from liquid wastes for disposable purposes.

An example of this problem is in the manufacture on rubber tires where the tires are subjected to a spray containing large amounts of solids consisting mostly of carbon black, synthetic rubber, mica, soapstone and bentone clay suspended in a solvent composed of white gasoline, ethyl alcohol, rubber cement stock, stearic acid, castor oil, a silicone emulsion, and polyalkaline glycol derivatives. The spray is applied to the inside and outside of rubber tires before being finally shaped in heated compression molds. The spraying process is inefficient in terms of the amount of solid material actually affixed to the tires as compared to the total amount directed thereon. The spray which does not remain on the tires must be treated in a collection device or scrubber. In such a device, most of the volatile solvents may be neutralized and exhausted. Some components, such as the mica, soapstone and bentone clay become suspended in the water of the collector. However, the carbon black and synthetic rubber do not enter suspension in the water and tend to coagulate into lumps or cake on the walls of the collector.

In most collectors of the type using water, to capture the particles in the exhaust stream, there is a reuse of the water between the spray nozzles or jets creating water screens through which the exhaust gases move and a sump associated with the collector. In some areas completely fresh water may be used directly and then discarded because of the low cost of the water in those areas.

In view of the problems presented in the collection and disposal of some materials, the present invention provides a new and improved system and method for cleaning a collector which requires very little labor, may be accomplished in a short period of time, and as a result thereof, may be utilized more frequently without shutting down of the equipment.

As a result of the invention, the only real expenditure of labor resides in the dumping of conventional portable solids collectors and the periodic, usually weekly, refilling of a liquid agent in the system. With the invention, it is possible to clarify the water in the system many times per week, and substantial solid buildup on the walls of the collector is eliminated. Also eliminated is the necessity of cleaning the interior of the collector manually. Solids which are collected in the system are virtually dry, and the clarified water is clean enough to be discharged into storm sewer lines without violation of environmental protection statutes. Howver, disposal of the water need be done only infrequently since the clarification process is sufficiently efficient to produce the water suitable for reuse in the collector.

Briefly stated, the invention in one form thereof as it may be applied to a collector which includes both suspendable solids and coagulating solids comprises a means for removing the entire contents of the collector into an agitatable receiver, agitating the receiver containing the waste with a flocculating agent to cause the suspended solids to flocculate on the surface of the larger particles of coagulated material, passing the flocculated particles to a separator where solids larger than a predetermined size are intercepted and discharged to a portable solids collector while the liquids and solids below the predetermined size move to a collecting sump. From there the clarified liquid is returned to the collecting device and the cycle is completed.

An object of the invention is to provide a new and improved liquid clarifier for use in conjunction with air scrubbers, dust collectors and the like.

Another object of this invention is to provide a new and improved apparatus which permits frequent cleaning of the collector, scrubber or similar device at low cost.

Another object of this invention is to provide apparatus of the type described wherein various constituents removed from the exhaust stream may be classified in solid disposal containers and the clarified liquid reused.

Other objects and advantages of the invention will be in part pointed out and in part made apparent from the succeeding description thereof.

The features of the invention which are believed to be novel are distinctly claimed and particularly pointed out in the concluding portion of this specification. However, the invention both as to its organization, operation and procedural steps, together with further objects and advantages thereof may best be appreciated by reference to the following detailed description taken in conjunction with the drawings, wherein:

The single FIGURE of drawings schematically exemplifies a system embodying the invention.

The invention is arranged to be practiced in conjunction with a device utilizing a liquid to separate impurities or contaminants from a gas stream. A system 10 embodying the invention is shown in conjunction with a device 11 which may be termed a wet dust collector, an air scrubber, etc. 11. The device 11 may take various forms. However, for purposes of illustration, an air scrubber 11 is shown which has an inlet duct 12 which leads from an exhaust hood, paint booth or other similar device and through the provision of a blower 13 is adapted to draw the contaminated gas therein for a scrubbing operation. The air moves in the direction of the arrows A through a scrubbing bath B and a tortuous path through baffles 14 and 15 in through a moisture eliminating arrangement 16 and is exhausted through blower 13 to a duct or any acceptable environment.

Scrubber 11 has an attached liquid level control 17 which includes a weir 18 feeding to a drain 19 through a valve 20 to control the water level and an inlet water makeup line 21 including a valve 22. A drain line 23 leads from the bottom of the scrubber through valves 24 and 24a. Valve 24 connects line 23 to an air pressure source 25 through line 26 for purposes hereinafter described. Both lines 19 and 23 lead to an agitatable receiver 27. Line 23 may contain a turbidimeter 28 for purposes hereinafter described and in one embodiment of the invention further includes the electrically operated valve 29. The agitatable receiver or hopper 27 is also adapted to receive a flocculating agent in liquid form through line 30 from a floc tank 31, through a valve 32 and a pump 33 operated by motor 34. The contents of receiver 27 is agitated and mixed by a mixing blade 27a driven by a motor 27b. As will hereinafter be described, the motor 34 may be operated either in response to a signal from the turbidimeter 28 or a signal from a switch 35 controlled by a float 36 within receiver 27. In one form of the invention, the switch 35 is arranged to control the operation of pump 33 through motor 34, and also a pump 37 through a motor 38. Pump 37 delivers the agitated liquid floc agent and the contaminants over line 39 to a particle disintegrating device or delumper 40 which cuts or hammers any large particles into a small size. A suitable device of this type is one marketed by Franklin Miller, Inc. of East Orange, N.J. under the registered trademark "Delumper" and consists of a conduit having parallel spacer bars thereacross through between which rotate choppers or hammers to chop, grind or hammer the particles into smaller sizes. The output of device 40 is applied via a connecting line to a particle classifier 41 which, as illustrated, comprises a baffle member 42 which directs the incoming liquid onto a screen 43. The liquid runs down the screen and particles below a given size will pass therethrough into portion 44 while the larger particles fall into oversized discharge area 45 and, hence, pass to a portable solids collector 46. The portable solids collector may be disconnected from its connections 47 and 48 in lines 49 and 50, respectively. The solids collector 46 in the form shown is provided with lower false bottoms 51 and 52 defining a small space therebetween to allow any liquid in collector 46 to drain to line 50. A pump 53 operated by a motor 54 will return any liquid collected at the bottom of collector 46 to receiver 27 over line 55. The liquid collected in portion 44 of classifier 41 is delivered over line 56 to a liquid collection sump 57. Liquid collection sump 57 includes a switch 58 operated by a float 59 to actuate a motor 60 driving a pump 61 to return the collected liquid over a line 62 through a check valve 63 to the water inlet 21 of scrubber 11. Line 62 also contains a shut-off valve 64 to direct the liquid to a drain through another valve 64a when open.

The system further includes a water makeup line 65 having shut-off valves 66 and 67 therein to direct water to either floc tank 31 or to scrubber 11. In the scrubber side of the line a check valve 68 is provided to prevent backflow of the recycled liquid coming over line 62. The floc tank 31 is a conventional mixing tank having a stirring device 69 driven by a motor 69a. The flocculating agent in either a powder or granular form may be added to tank 31 through an opening 70 therein and the water added over line 65 and then the flocculating agent is mixed into liquid form in tank 31.

A complete cycle of operation with respect to the aforementioned collected material is as follows:

When collector or scrubber 11 is shut down some of the water will overflow through weir 18 into the agitated hopper 27 when valve 20 is opened. The operator then opens valve 24 to blow compressed air into scrubber 11 and breaks any solids away from the surfaces. Valves 24a and 29 are then opened to drain the remaining water with solids from device 11. When valve 29 is opened, a predetermined timed operation commences. Motors 34 and 38 are energized to operate pumps 33 and 37. As long as sufficient liquid is in hopper 27 the float control switch 35 allows pump 37 to run and also prevents pump 33 from continuously delivering the flocculating agent from tank 31 when pump 37 is not running. This insures a uniform addition of flocculating agent. The initiation of the cycle also starts up the agitation of hopper 27 by energizing motor 27b and further commences operation of the delumper 40. Liquid entering the hopper is mixed with the flocculating agent, and the suspended particles (mica, soapstone and clay, in the beforementioned example) will adhere to the larger coagulants. In this illustrative example, the particles in suspension adhere to the carbon black and latex. Pump 37 moves this mixture through delumper 40 where the particles are broken up. As the liquid, together with the particles, flows through classifier 41, solids larger than a size predetermined by the screen 43 move down the surface of the screen and are discharged into portable solids collector 46, while liquids and smaller particles fall through screen 43 into the liquid collection sump 57. The float operated switch 58 in the liquid collection sump activates motor 60 and, hence, pump 61 when the liquid reaches a predetermined level. The clarified liquid is then returned to the collection device through valve 64, line 62, check valve 63 and line 21. After a predetermined time, the electrically operated valve 29 closes, pump 37, motor 27b, motor 34 and, hence, pump 33, and the delumping device 40 continue to run for a short period of time; for example, thirty seconds on a time delay. Motor 60 and pump 61 will continue to run until float control switch 58 shuts off motor 60.

The portable solids collector 46 has sloped false bottoms or baffles 51 and 52 which allows any liquid carried with the solids to drain off.

When solids collector 46 is to be emptied, pump 53 is operated through motor 54 to drain the bottom of collector 46. Couplings 48 and 50 are then broken and collector 46 carried off through a disposal point.

If at any time it is desired to refill the system with fresh water, valve 64 is closed, valve 64a opened and motor 60 and pump 61 operated to pump the collected liquid from tank 57 directly to the drain.

If the invention should be embodied in a continuously operating system, the delumper may be eliminated.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. In combination with a particle collection device using a liquid as a scrubbing agent and having coagulated solids and particles in suspension therein, a receiver for holding a flocculating agent, a mixer, first liquid conduit means connecting said device and said mixer, second liquid conduit means connecting said receiver to said mixer, said mixer being arranged to agitate the flocculating agent and the liquid to cause the suspended particles to flocculate on the coagulated particles, third conduit means connecting said mixer to a particle size classifying device, said classifier being effective to separate the coagulated and flocculated particles from the liquid, fourth conduit means connecting said classifying device to a solids collector, and fifth conduit means for returning liquid from said solids collector to said mixer.

2. The invention of claim 1 further including means prior to said classifier for breaking the coagulated and flocculated particles into smaller sizes.

3. The invention of claim 2 further including a turbidimeter in said first conduit means for sensing the turbidity of liquid and controlling the amount of flocculating agent introduced into said mixer.

* * * * *